United States Patent Office 3,284,828
Patented Nov. 15, 1966

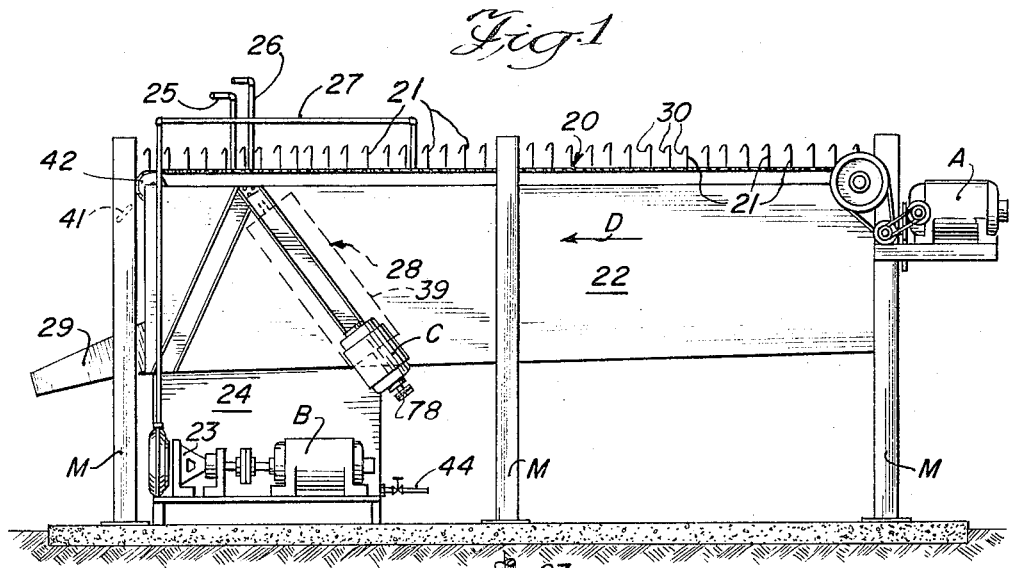
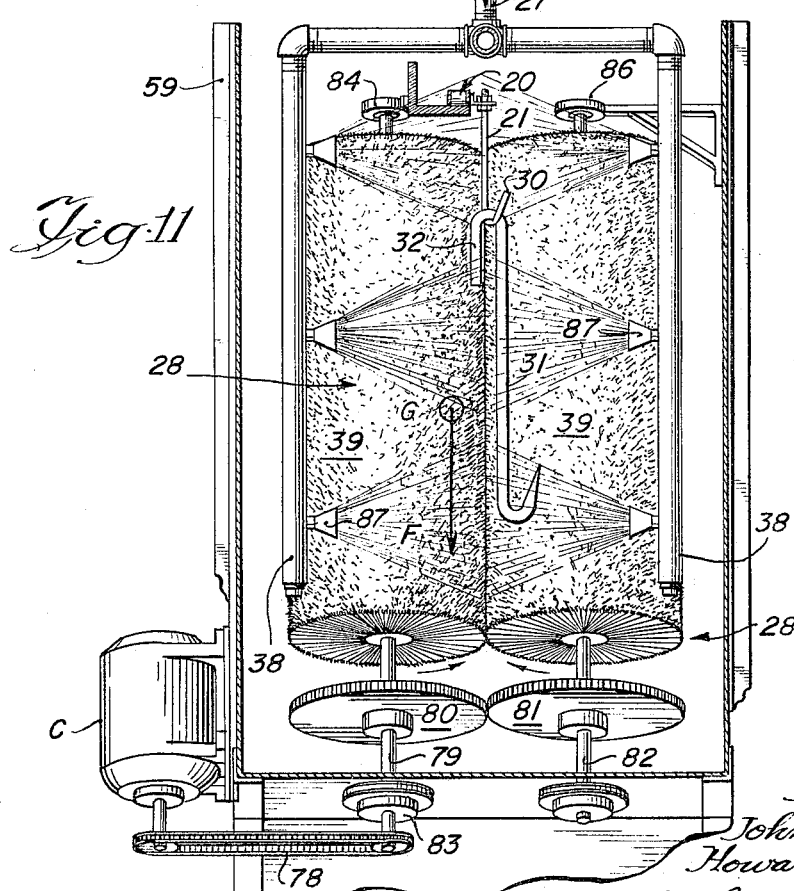

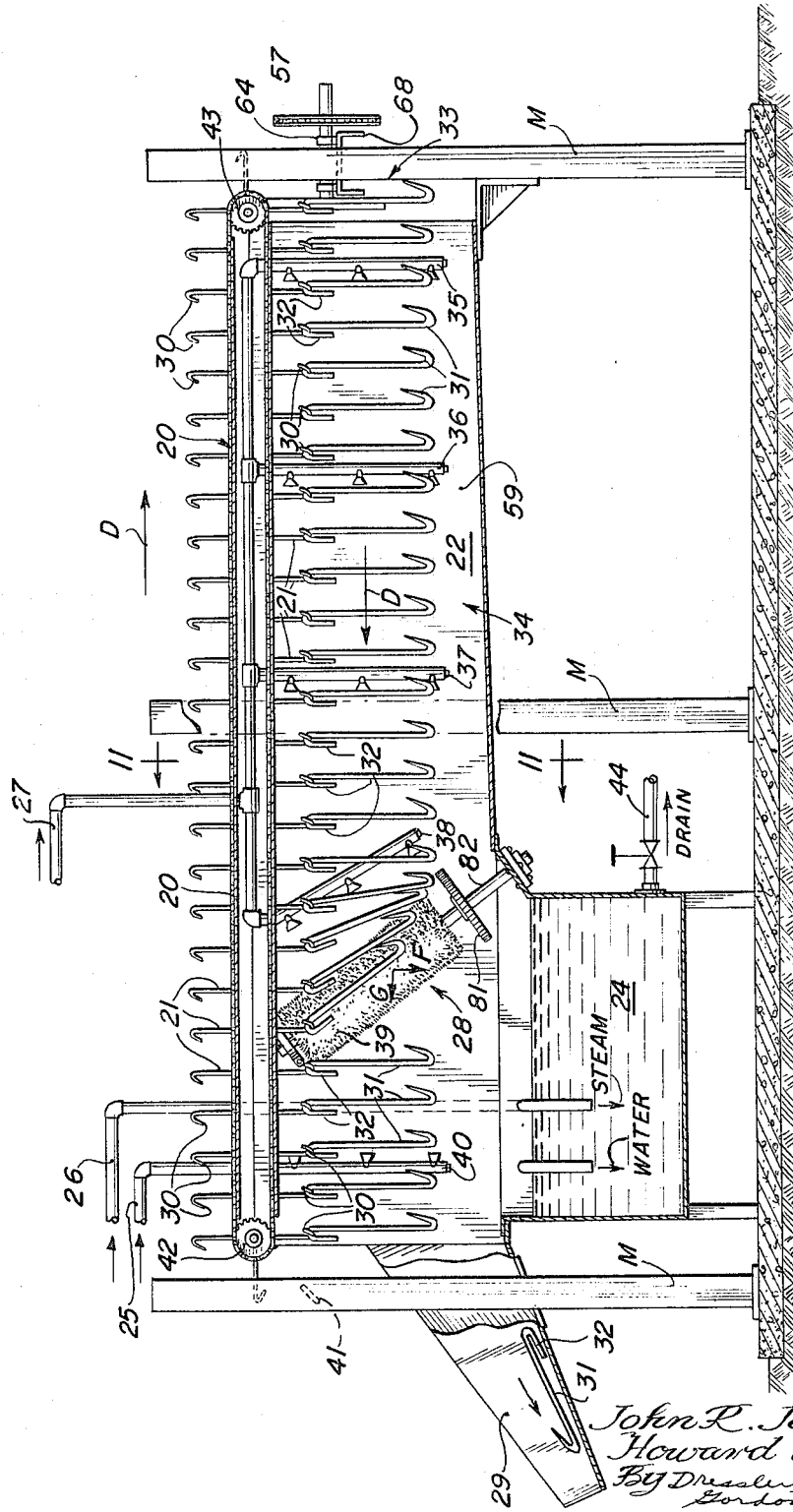

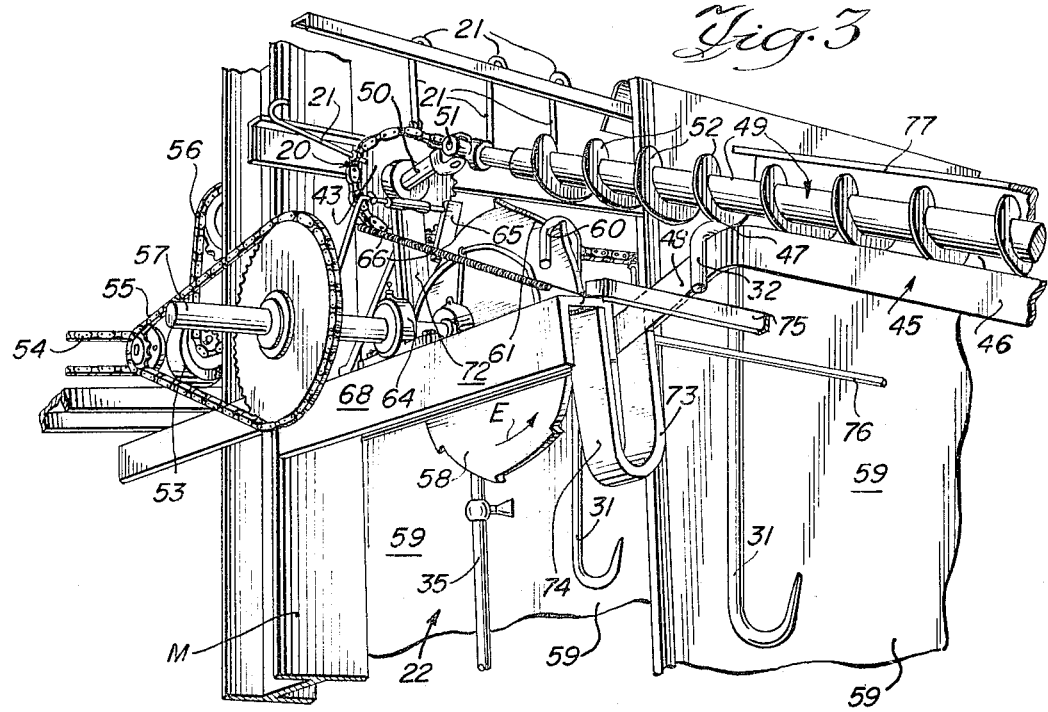
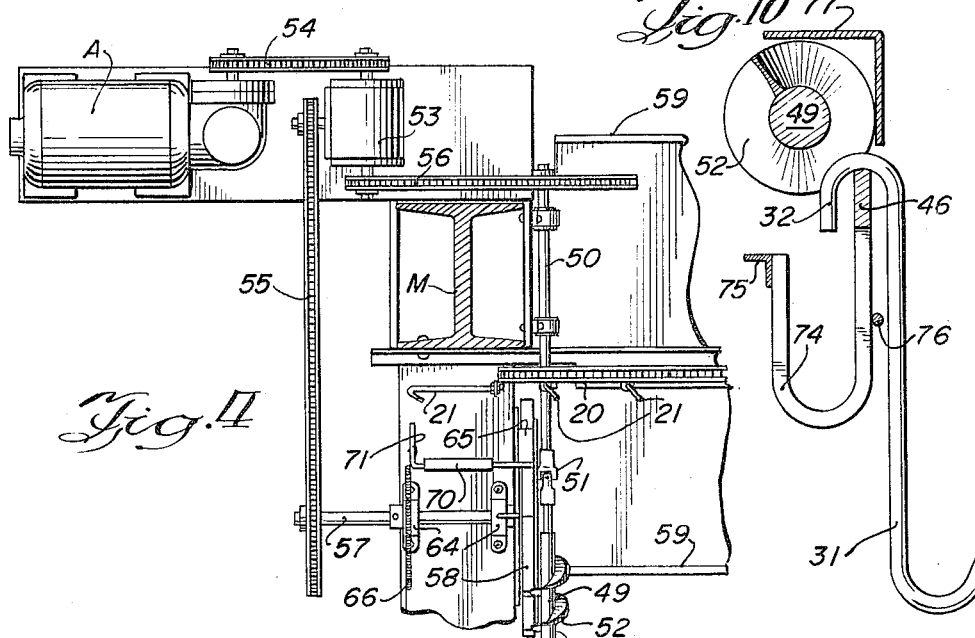

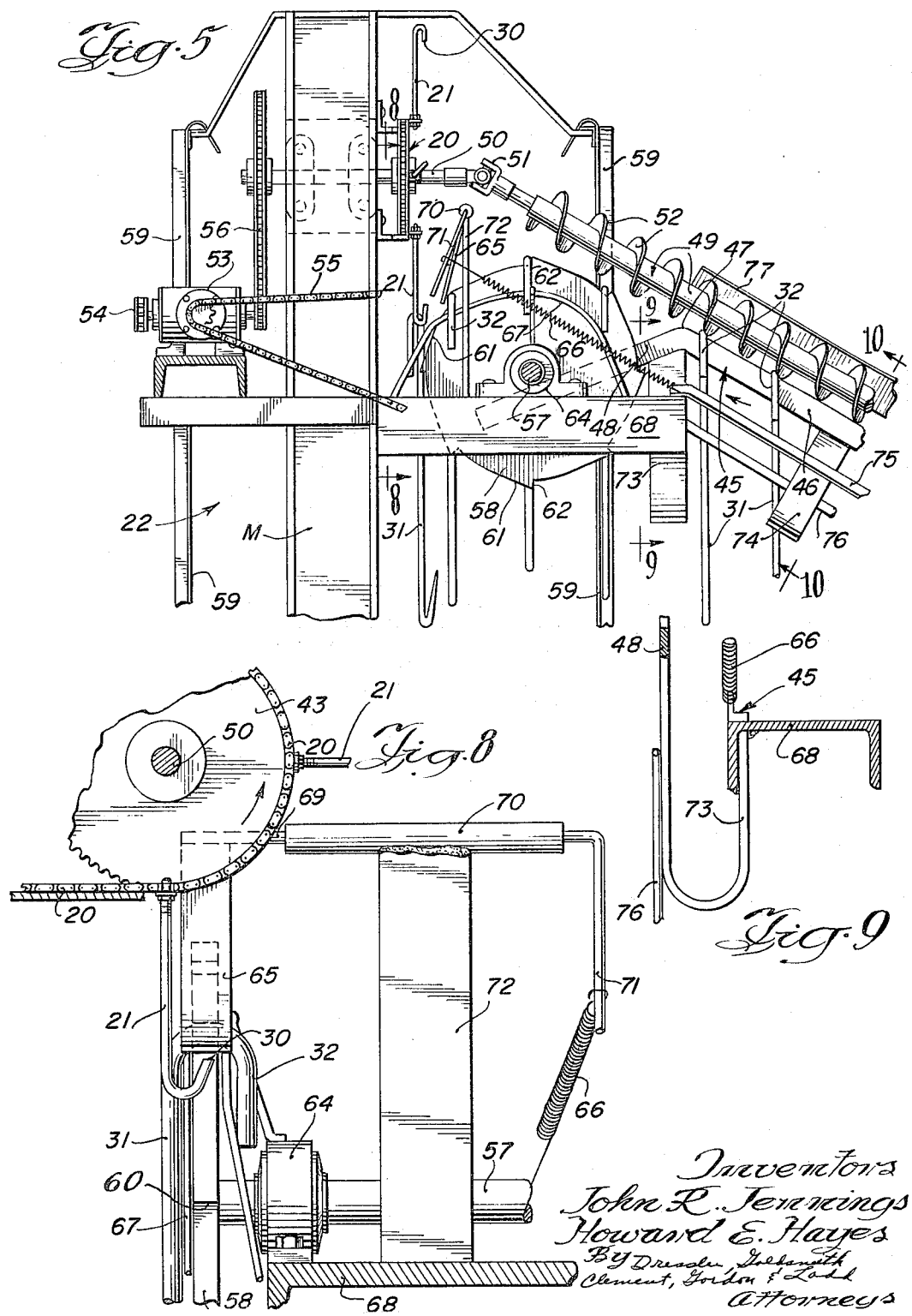

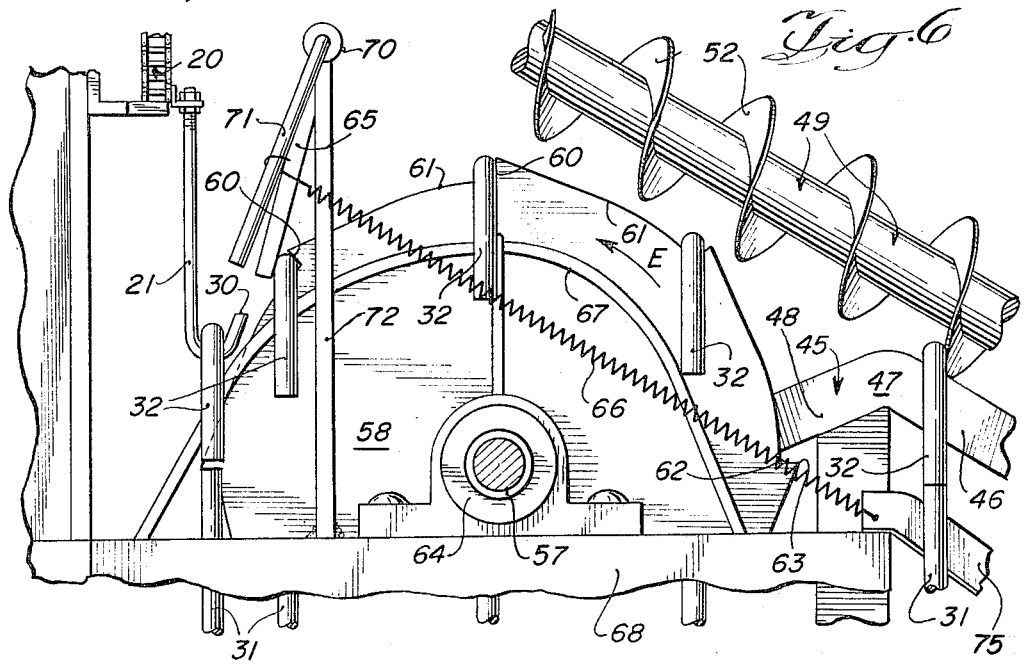
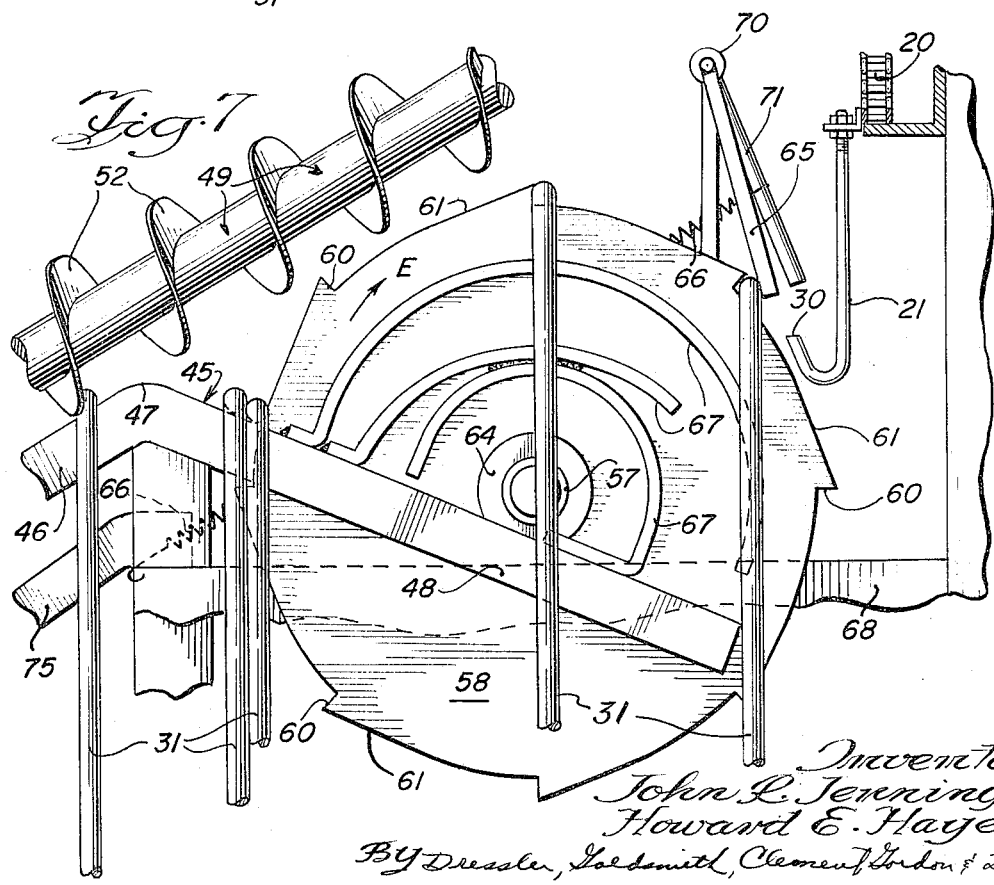

3,284,828
HOOK WASHER
John R. Jennings, Downers Grove, Ill., and Howard E. Hayes, Cedar Rapids, Iowa, assignors to Wilson & Co., Inc., a corporation of Delaware
Filed Feb. 23, 1965, Ser. No. 434,352
11 Claims. (Cl. 15—21)

This invention relates to the automatic handling and washing of hooks, especially meat hooks of the type used in refrigerator cars for the carrying of sides of meat, and the like.

Prior methods of washing meat hooks have relied upon the gathering of the hooks into batches which are introduced into a wash area and removed after the wash operation. These methods involve excessive time, labor, and are costly and inefficient. The invention presents a washing system of improved efficiency, employing carrying hooks to individually transport the hooks to be washed.

In accordance with the invention, a system for washing hooks having the upper ends thereof bent to form a means of securement is provided in which the hooks to be washed are individually transported through a wash area and a brush area while hanging by means of their bent upper ends on carrying hooks. The hooks are introduced to the carrying hooks individually, so that each hook is transported by a separate carrier hook. The carrying hooks are attached to a conveyor so that the pointed ends thereof are directed upwardly while the hooks to be washed are carried, and the pointed ends are subsequently directed downwardly to release the hooks. The wash area houses devices for spraying each of the hooks with a cleaning solution as they are conveyed and the brush area houses brush means for thoroughly scrubbing the hooks with the cleaning solution thereon. The hooks are removed from the carrying hooks after they leave the brush area.

It is a further aspect of the invention to have the hooks supplied on a rail, along which they are slid by some motivating means to a device for lifting the hooks individually and dropping them singly on the carrying hooks, the device being synchronized with the movement of the carrying hooks, so that each of the hooks is individually dropped on one of the carrying hooks.

The invention will be more fully described in conjunction with the accompanying drawings, in which:

FIGURE 1 is a side elevation providing an overall view of a device constructed in accordance with the invention;

FIGURE 2 is a side elevation, similar to FIGURE 1 but on an enlarged scale and partly in section to show the overall relation between the hooks being washed, the application of cleaning solution thereto and the brushing of the carried hooks;

FIGURE 3 is a partial perspective view of the mechanism for supplying hooks to be cleaned;

FIGURE 4 is a plan view of the structure shown in FIGURE 3;

FIGURE 5 is a side elevation of the structure shown in FIGURE 3;

FIGURE 6 is an enlarged fragmentary view of part of the structure shown in FIGURE 5;

FIGURE 7 shows the same structure shown in FIGURE 6, but from the opposite direction;

FIGURE 8 is a partial view of the hook supply mechanism taken on line 8—8 of FIGURE 5 and showing the action of the hook retention flap in assisting the synchronized deposit of individual hooks on the carrier hooks;

FIGURES 9 and 10 show details of the hook-carrying rail construction; and

FIGURE 11 shows the details of the brushing structure used in the invention.

Referring more particularly to the drawings, FIGURE 1 shows a side view of a washing device constructed in accordance with the invention. In this structure, motor A drives a hook-carrying conveyor 20 with hook carriers 21 secured thereto. The conveyor 20 carries the carrier hooks 21 through a cleaning area 22. Motor B drives a fluid pump 23, which pumps cleaning solution from tank 24, fed by pipes 25 and 26, through pipe 27 to a spray unit, discussed herein after. Brushing means 28, driven by motor C, brush the hooks with cleaning solution thereon as they are conveyed in the direction shown by arrow D. The cleaned hooks drop onto a chute 29 to be discharged from the washing device. The structure is supported by frame members M.

Referring to FIGURE 2, which shows an enlarged side elevation similar to FIGURE 1, the hook carrying conveyor 20 and the hook carriers 21 are more fully visible.

It will be seen that the hook carriers 21 are carried through the wash area 22 by the conveyor 20 and, as they move through the wash area 22, the pointed ends 30 of the hook carriers 21 are pointed upwardly so they can receive the hooks to be cleaned, designated by numeral 31. The conveyor 20 carries the carrying hooks through a continuous path which includes a lower hook-transporting section which moves through the wash area 22 and an upper return section in which the carrying hooks 21 are inverted so that their points 30 are directed downwardly. This reversal in the direction of the points 30 facilitates the discharge of the hooks 31 after these have been cleaned, as will be more fully apparent later.

FIGURE 2 also shows the disposition of the hooks 31 on the carrier hooks 21. As will be seen, the hooks 31 are formed to include an upper turned over end portion 32 which is draped over the points 30 of the hooks 21. In this way, and as will later more fully appear, it is a simple matter to position the hooks 31 on the carrier hooks 21 and also to release them after the washing operation is performed. At the same time, the hooks 31 are positively held in a manner permitting a vigorous brushing action, as will be described more fully hereinafter.

As will also be seen from FIGURE 2, the hooks 31 are deposited on the hook carriers at a hook receiving position indicated by the numeral 33 whereupon it is carried through a zone 34 in which a washing solution is sprayed upon the hooks 31 by means of spray devices 35, 36, 37 and 38, respectively and the sprayed hooks are then carried through brushes 39 and then discharged through the chute 29. FIGURE 2 also illustrates preferred practice in which, after brushing is completed, a rinse solution is sprayed on the brush hooks as indicated by the spray device 40.

As will be seen in the left hand corner of FIGURE 2, the hooks 31 are lifted as the carrier hooks 21 move upwardly around the pulley 42 with the hooks 31 being stopped by a contact member 41 which causes the hooks 31 to be forced off the point 30 of the carrier hooks 21. The hooks 31, dislodged from their carrier elements in this manner, drop on to discharge chute 29 and are discharged as indicated.

The movement of the hooks 21 around the pulleys 42 and 43 is indicated by the arrow D.

FIGURE 2 illustrates a further element of preferred practice in which the washing solution, as well as any rinse solution which may be used, drain into a common tank 24 which is supplied with both an aqueous cleaning solution and steam through 25 and 26, respectively, so that the cleaning solution can be reused continuously with a drainage means 44 being employed to permit replacement of the cleaning solution as needed.

It is to be particularly noted that FIGURE 2 illustrates the action of the brushes 39 on the suspended hooks 31, but this will be more fully discussed in connection with the enlarged view presented in FIGURE 11 hereinafter.

FIGURES 3, 4 and 5 show the means used to supply the hooks 31.

Referring first to FIGURE 3, the hooks 31 are moved along a rail 45, having an ascending sloped portion 46 leading to a peak 47 and then a descending sloped portion 48, by means of an auger 49. The auger 49 is connected to drive shaft 50 through a universal connection 51 and is driven thereby. The auger 49 includes a helical blade 52 which engages the overturned ends 32 of the hooks 31 which have been manually positioned upon the rail by an operator and functions to move the hooks 31 upwardly along the ascending portion 46 of the rail 45 until the peak 47 of the rail is passed whereby the hooks fall by weight of gravity and thereby slide down the descending portion 48 of the rail.

Referring particularly to FIGURE 4, the motor A directly drives a gear reduction unit 53 by means of a chain 54 and the gear reduction unit 53, in turn, drives two chains 55 and 56. The first chain 55 rotates shaft 57 which, as will be better seen in FIGURE 3, functions to rotate the hook selector 58. The second chain 56 rotates the shaft 50 to drive the conveyor 20 and also, through the universal joint 51, to operate the auger 49. Since hook selector 58 and conveyor 20 are powered through the same unit 53, they are easily synchronized with one another.

The sides 59 of the washing device are also visible in FIGURES 3 and 4.

The action of the hook selector 58 to select individual hooks 31 by their overturned ends 32 and then to drop these on the upturned points 31 of the carrier hooks 21 will be more fully seen from an analysis of FIGURES 5, 6, 7 and 8.

Referring to FIGURES 5–8, the hooks 31 are moved upwardly along the ascending portion 46 of rail 45 until the peak 47 of the rail is passed, whereby the hooks slide down the descending portion 48 of the rail 45 to engage the hook selector 58. This can be seen with particular clarity in FIGURE 7. The hook selector 58 consists of a disc whose outer edges have steps 60 with sloped portions 61 interconnecting the same. The steps 60 extend radially of the hook selector 58. The hook selector 58 is driven by shaft 57, passing through the bearing 64. The hook selector 58 is so positioned that as it rotates, shown by arrow E, the steps 60 are moving in a direction to engage and lift a single hook 31 as the hook 31 rests against the sloped portion 61. If several hooks 31 are present and awaiting transport, only one is selected. As the hooks 31 are lifted and conveyed to a dropping point, a spring biased retention flap 65, held tight against the hook selector 58 by the spring 66 and further explained hereinafter with respect to FIGURE 8, contacts the hooks 31 and holds them tightly against the step 60. As soon as the hooks are moved beyond the flap 65, as shown at the right in FIGURE 7, they will drop easily with their overturned ends 32 overlapping the pointed ends 30 of the hook carrier 21. Arcuate bars 67 are employed to give the proper vertical attitude to the hooks 31 while they are being moved by the hook selector 58. The arcuate bars 67 are used on both sides of the hook selector 58, and are secured on one side to the rail portion 48 and on the other side to a frame element 68.

Referring to FIGURE 8, the retention flap 65 is secured to one end of a bar 69, the bar passing through a journal 70. The other end 71 of the bar 69 is bent 90°, forming an L-shaped structure. The journal 70 is secured to a vertical frame 72, which in turn is secured to frame element 68. The spring 66 is attached to the arm 71 to bias the flap 65 into its hook-retaining position.

Referring to FIGURE 9, a U-shaped support 73 has one of its legs secured to the frame element 68 and the other leg secured to the descending rail portion 48, functioning to hold the rail portion 48 in position.

Referring to FIGURE 10, a U-shaped support 74 has one of its legs secured to an angle iron support 75, which is also secured to the frame element 68 as shown in FIGURE 5, and the other leg of the U-shaped support 74, secured to the ascending rail portion 46, functions to hold the rail portion 46 in position. Secured below the rail and on the outside of the U-shaped support 74 is a bar 76, which functions to maintain the hook 31 in a vertical attitude while being moved along the rail portion 46. The hook 31 has its overturned end 32 extending over the rail portion 46 and contacting the helical blade 52 of the auger 49, which moves the hook 31 up the ascending rail portion 46. The helical blades 52 of the auger 49 are partially covered by a shield 77, which serves as a safety guard.

Referring to FIGURES 2 and 11, the hook 31 has its upper overturned end 32 draped over the upwardly directed point 30 of the carrier hook 21, as the conveyor 20 carries the hook 31 past the spray element 38 to the juxtaposed brushes 39, following the path as recited with respect to FIGURE 2.

The brush means 28 is driven by shaft 79, which in turn is driven by motor C by means of belt 78. The spur gear 80 is secured to the shaft 79 and has its teeth meshed with the teeth of spur gear 81, which is secured to the shaft 82, so that when shaft 79 is turned, the spur gear 80 turns, thus driving the spur gear 81 and the shaft 82 in the opposite direction. The brushes 39 are affixed to the shafts 79 and 82. The shafts 79 and 82 are mounted in bearings 83, 84, 85 and 86.

The brush means 28 is constituted by a pair of juxtaposed cylindrical brushes 39 which are rotated in opposite directions and mounted at an angle with their upper ends tilted forwardly in the direction of movement D as shown in FIGURE 2, with the brushes 39 positioned in the path of the conveyed hooks 31 so that these hooks pass between the opposed brushes, as shown in FIGURE 11, with the lower end of the hooks 31 engaging the brushes first. As the hooks 31 contact the brushes 39, they are subjected to two forces, one tending to pull the hook 31 down, denoted by arrow F, and the other tending to pull the hook 31 through the brushes, denoted by arrow G.

As the brush elements of brushes 39 act upon the hooks 31, they pull downwardly and this force is resisted by the fact that the hooks 31 are held against downward movement by the carrier hooks 21. Thus, the brush elements forcibly move over the hooks 31 to clean them and do not simply thrust the hooks 31 through the brush device 28. Also, and as the hooks 31 move through the brushes 39, they are engaged progressively by brush elements throughout almost the full length of the brushes to further insure thorough brushing.

The spray elements, such as spray element 38, are of an inverted U shape and are supplied with liquid by pipe 27. The spray elements include several nozzles 87 so that the hooks 31 are uniformly sprayed from both sides. The spray element 38 is mounted at an angle, as shown in FIGURE 2, to conform with the angle of brushes 39.

The invention is defined in the claims which follow.

We claim:

1. A system for washing hooks having overturned upper ends comprising, conveyor means carrying carrier hooks through a continuous path including a hook-transporting section in which said carrier hooks have their points directed upwardly and a return section in which said carrier hooks have their points directed downwardly, means for hanging the hooks to be washed individually upon said carrier hooks to be carried thereby through said hook-transporting section, means to spray each of said hooks to be washed as they are conveyed with a cleaning solution, brush means for brushing said hooks with cleaning solution thereon and means including reversal in the direction of the points of said carrier hooks to release the brushed hooks from said carrier hooks.

2. A system as recited in claim 1 in which said means for hanging the hooks to be washed includes means synchronized with the movement of said carrier hooks for lifting individual hooks to be washed with their overturned ends uppermost and dropping them upon the upwardly directed points of said carrier hooks.

3. A system as recited in claim 1 in which said brush means includes juxtaposed brushes on opposite sides of the path of movement of the hooks to be washed.

4. A system for washing hooks having overturned upper ends comprising, conveyor means carrying carrier hooks through a continuous path including a hook-transporting section in which said carrier hooks have their points directed upwardly and a return section in which said carrier hooks have their points directed downwardly, means for individually hanging the hooks to be washed including means synchronized with the movement of said carrier hooks for lifting individual hooks to be washed with their overturned ends uppermost and dropping them upon the upwardly directed points of said carrier hooks to be carried thereby through said hook-transporting section, means to spray each of said hooks to be washed as they are conveyed with a cleaning solution, brush means including juxtaposed oppositely rotated forwardly tilted brushes on opposite sides of the path of movement of the hooks to be washed for brushing said hooks with cleaning solution thereon, and means including reversal in the direction of the points of the carrier hooks to release the brushed hooks from said carrier hooks.

5. Apparatus for feeding hooks suspended by their overturned upper ends comprising, a rail, including an ascending sloped portion, a descending sloped portion, and a peak portion connecting the same, and auger means paralleling said ascending rail portion for sliding said hooks upwardly past said peak whereby said hooks will slide forwardly down said descending sloped portion to be supplied thereby.

6. Apparatus for individually hanging hooks having their overturned upper ends on continuously moving carrier hooks comprising conveyor means for moving said carrier hooks through a path with the pointed ends thereof directed upwardly, descending sloped rail means slidingly supplying said hooks while said hooks are suspended upon said rail means by their overturned upper ends, a hook selector disc having radial steps dimensioned to correspond with the width of said hooks, said steps being interconnected by sloped portions on the exterior of said disc, said selector disc being positioned in the path of said rail means whereby said hooks slide, one by one, from said rail means onto said steps to be delivered, one by one, after said disc has rotated to carry said hooks upwardly off said rail and over said disc to be dropped therefrom by gravity into the path of said carrier hooks, and means to synchronously power said conveyor means and said hook selector so that said carrier hooks are beneath said hooks when they are dropped by said selector disc.

7. Apparatus as recited in claim 6 in which resiliently biased flap means is positioned in the descending path of said steps to hold said hooks against said steps until said hooks are clear of the lower end of said flap to insure accurate timed dropping of said hooks.

8. Apparatus as recited in claim 6 in which arcuate bar means are positioned on either side of said hook selector disc to insure the vertical attitude of said hooks on said selector disc.

9. Apparatus for moving hooks to a continuously moving longitudinally extending conveyor having hook receiving portions comprising, means for moving said conveyor into position to receive said hooks; a feed conveyor for directing hooks to said longitudinal conveyor including a rail means, said rail means including an upwardly extending portion on which said hooks are moved by said feed conveyor and a downwardly extending portion, a hook selector disc positioned to receive said hooks from said downwardly extending portion and to position them on to said longitudinally extending conveyor, said hook selector disc having radial steps dimensioned to correspond with the width of said hooks, and means to synchronously power said longitudinal conveyor and said hook selector so that said hooks are placed on the hook receiving portions of said longitudinal conveyor by said hook selector disc.

10. Apparatus for washing hooked members including means for moving said members to a continuously moving longitudinally extending conveyor having hook receiving portions comprising, means for moving said conveyor into position to receive said hooks, a feed conveyor for directing hooks to said longitudinal conveyor including a rail means, said rail means including an upwardly extending portion on which said hooks are moved by said feed conveyor and a downwardly extending portion, and a hook selector disc positioned to receive said hooks from said downwardly extending portion and to position them on to said longitudinally extending conveyor, said hook selector disc having radial steps dimensioned to correspond with the width of said hooks, means to synchronously power said longitudinal conveyor and said hook selector so that said hooks are placed on said longitudinal conveyor by said hook selector disc, means for washing said hooked members, and means for removing said hooked members from said longitudinal conveyor after they are washed.

11. Apparatus for washing hooked members including means for moving said members to a continuously moving longitudinally extending conveyor having hook receiving portions comprising means for moving said conveyor into position to receive said hooks, a feed conveyor for directing hooks to said longitudinal conveyor including a rail means, said rail means including an upwardly extending portion on which said hooks are moved by said feed conveyor and a downwardly extending portion, and a hook selector disc positioned to receive said hooks from said downwardly extending portion and to position them on to said longitudinally extending conveyor, said hook selector disc having radial steps dimensioned to correspond with the width of said hooks, means to synchronously power said longitudinal conveyor and said hook selector so that said hooks are placed on said longitudinal conveyor by said hook selector disc, means for washing said hooked members, including power driven brushes, spray nozzles disposed adjacent said longitudinal conveyor, and means for rinsing said hooked members after they are washed, and means for removing said hooked members from said longitudinal conveyor after they are washed.

References Cited by the Examiner
UNITED STATES PATENTS

| | | | |
|---|---|---|---|
| 116,769 | 7/1871 | Sprague | 198—77 |
| 613,191 | 10/1898 | Cowin | 198—77 |
| 1,301,997 | 4/1919 | Becker | 198—103 |
| 1,951,400 | 3/1934 | Dvorak | 198—177 |
| 2,109,148 | 2/1938 | Gwinn | 198—25 |
| 2,269,807 | 1/1942 | Buckley | 15—77 |
| 2,291,553 | 7/1942 | Mathy et al. | 15—77 |
| 2,293,858 | 8/1942 | Schafer | 15—77 |

EVON C. BLUNK, *Primary Examiner.*

CHARLES A. WILLMUTH, *Examiner.*

E. L. ROBERTS, M. L. AJEMAN, *Assistant Examiners.*